(12) United States Patent
Winkel

(10) Patent No.: US 8,035,555 B2
(45) Date of Patent: Oct. 11, 2011

(54) SPREADING CODES FOR A SATELLITE NAVIGATION SYSTEM

(76) Inventor: Jon Olafur Winkel, Schierling (DE)

( * ) Notice: Subject to any disclaimer, the term of this patent is extended or adjusted under 35 U.S.C. 154(b) by 781 days.

(21) Appl. No.: 11/793,070

(22) PCT Filed: Dec. 17, 2004

(86) PCT No.: PCT/EP2004/014488
§ 371 (c)(1),
(2), (4) Date: Mar. 13, 2008

(87) PCT Pub. No.: WO2006/063613
PCT Pub. Date: Jun. 22, 2006

(65) Prior Publication Data
US 2008/0246655 A1    Oct. 9, 2008

(51) Int. Cl.
*G01S 19/02* (2010.01)
*G01S 19/30* (2010.01)
(52) U.S. Cl. .................. 342/357.395; 342/357.69
(58) Field of Classification Search .............. None
See application file for complete search history.

(56) References Cited

U.S. PATENT DOCUMENTS

| | | | |
|---|---|---|---|
| 4,642,647 A | 2/1987 | Sturza et al. | |
| 5,559,829 A * | 9/1996 | Le Strat et al. | 375/141 |
| 5,963,584 A * | 10/1999 | Boulanger et al. | 375/141 |
| 6,912,240 B2 * | 6/2005 | Kumar et al. | 375/130 |
| 7,400,666 B2 * | 7/2008 | Brethour et al. | 375/130 |
| 7,529,291 B2 * | 5/2009 | Dutka | 375/149 |
| 2002/0041251 A1 | 4/2002 | Yamaashi | |
| 2003/0187576 A1 | 10/2003 | Sanmiya | |
| 2003/0202565 A1 | 10/2003 | Li et al. | 375/147 |
| 2009/0196329 A1 * | 8/2009 | Legate et al. | 375/141 |

FOREIGN PATENT DOCUMENTS

| | | |
|---|---|---|
| EP | 0 767 544 A2 | 3/1996 |
| JP | 2002071782 A2 | 3/2002 |
| JP | 2003110462 A2 | 4/2003 |
| JP | 2003255040 A2 | 9/2003 |
| WO | WO 2004/057784 A1 | 12/2003 |

OTHER PUBLICATIONS

Pratt, Anthony "A New Class of Spreading COdes Exhibiting Low Cross-Correlation Properties", ION GPS 2002, 9/2202, pp. 1554-1564.*

(Continued)

*Primary Examiner* — Gregory C Issing
(74) *Attorney, Agent, or Firm* — Park, Vaughan, Fleming & Dowler LLP

(57) ABSTRACT

One embodiment of the present invention provides a method of creating a set of spreading codes for use in a satellite navigation system comprising a constellation of satellites. Each satellite in the constellation is to be allocated a spreading code from the set of spreading codes. The method comprises generating an initial set of bit patterns (105), where each bit pattern represents a potential spreading code, and performing an optimization process on the initial set of bit patterns (110). The optimization process modifies at least some of the bit patterns in the initial set to create a final set of bit patterns for use as the set of spreading codes (115) for the satellite navigation system. Receivers that support the satellite navigation system incorporate the final set of bit patterns for use in signal acquisition and position determination.

27 Claims, 10 Drawing Sheets

OTHER PUBLICATIONS

Karkkainen et al. "The Influece of Initial Phases of a PN Code Set on the Performance of an Asynchrounous DS-CDMA System," Wireless Personal Communications 13: 279-293, copyright 2000.*

Armanavicius, G. et al. "Analysis of Pseud Noise Sequences for Multi-Channel Distance Measurements," ISSN 1392-2114 Ultragaras, Nr.4(37). 2000.pp. 16-23.*

Publication: "*SDR Technology Applied to Galileo Receivers*", by F. Dovis, P. Mulassano, A. Gramazio, ION GPS 2002 Portland, OR (USA), Sep. 24-27, 2002, pp. 2566-2575.

Publication: "*Asynchronous Multiple-Access Interference Suppression and Ship Waveform Selection With Aperiodic Random Sequences*", by Tan F. Wong et al., IEEE, vol. 47, No. 1, Jan. 1999, pp. 103-114.

Publication: A New Class of Spreading Codes Exhibiting Low Cross-Correlation Properties by Anthony r. Pratt, ION GPS 2002, Sep. 24-27, 2002, Portland, OR, pp. 1554-1564.

Publication: "*Concatenated Sequential Codes Performance Attributes and Applications for Galileo*", by Anthony R. Pratt et al., ION NTM 2004, Jan. 26-28, 2004, San Diego, CA, pp. 313-322.

JP2003110462 A dated Apr. 11, 2003, Translation dated Oct. 26, 2010.

* cited by examiner

SPREADING CODES FOR A SATELLITE NAVIGATION SYSTEM

FIELD OF THE INVENTION

The present invention relates to the generation and use of a set of spreading codes for a satellite navigation system in which each satellite is allocated one or more spreading codes.

BACKGROUND OF THE INVENTION

Satellite navigation systems are becoming increasingly important in a wide range of applications, including handheld devices for position determination, in-car navigation support, and so on. The main satellite navigation system in service at present is the global positioning system (GPS) operated by the United States Department of Defense. Worldwide sales of GPS equipment reached nearly 3.5 billion dollars by 2003, and this figure is expected to grow steadily over the next few years. A European counterpart satellite navigation system, named Galileo, is planned for launch and service availability later this decade.

A satellite navigation system comprises a constellation of satellites that each broadcasts one or more signals to earth. The basic components of a satellite signal are a spreading code (also referred to as a positioning, synchronisation or ranging code) which is combined with navigation data. The resulting combination is then modulated onto a carrier at a set frequency for transmission to earth. In some cases, multiple signals (referred to as channels) may be modulated onto a single carrier via some appropriate multiplexing scheme. In addition, each satellite generally transmits at multiple frequencies, which can help to compensate for any atmospheric distortion.

The spreading code component of a satellite signal typically comprises a predetermined sequence of bits (sometimes referred to as 'chips') and is used to perform two main tasks. Firstly, the spreading code provides a synchronisation mechanism to allow a receiver to lock onto a satellite signal. Thus each satellite (and typically each channel broadcast from that satellite) has its own synchronisation code. When a receiver is first switched on, it does not know which satellite signals can be received, since certain satellites in the constellation will be below the horizon for that particular location at that particular time. The receiver uses the synchronisation codes to lock into a signal from a first satellite. Once this has been done, the navigation data in the signal can be accessed. This then provides ephemeris data for the other satellites in the constellation, and allows the remaining satellites that are visible to the receiver to be acquired relatively quickly.

The second main task of a spreading code is to provide a distance estimate from the satellite to the receiver, based on the time that it has taken the signal to travel from the satellite to the receiver, which can be expressed as: $c(Tr-Ts)$, where:
c is the velocity of light (known, subject to ionospheric effects, etc),
Ts is the time of sending from the satellite, which is encoded into the signal itself, and
Tr is the time of signal receipt at the receiver.

The position of the receiver can then be determined in three-dimensional space by using a process of trilateration, given the known positions of the satellites (as specified in their navigation data). In theory, this can be performed with signal information from a minimum of three satellites. In practice however we can write $Tr=Tm+o$, where Tm is the measured time of receipt at the receiver, and o is the offset between the receiver clock and satellite clock, which is generally unknown, except for specialised receivers. This then implies that signal information is obtained from at least one additional satellite to compensate for the unknown time offset at the receiver. If signals from further satellites are available, a statistical position determination can be performed using any appropriate algorithm such as least squares. This can also provide some indication of the error associated with an estimated position.

One important parameter for the spreading code is the bit rate at which the spreading code is transmitted, since this in turn controls the accuracy with which the positional determination can be made. For example, with a bit rate of 1 MHz, each bit represents a light travel time of 300 meters. The positioning accuracy is then determined by how accurately the phase offset between the satellite and the receiver can be judged for a single bit. This is generally dependent upon the noise in the system. For example, if the phase offset can be measured to an accuracy of 90 degrees ($\pi/2$), this corresponds to a positional determination of 75 meters. It will be appreciated that having a higher bit rate for the spreading code allows more accurate position determinations to be made.

Another important parameter for the spreading code is its total length, in other words the number of bits or chips in the spreading code before it repeats. One reason for this is that the finite length of the spreading code can lead to ambiguity in the position determination. For example, assume that the bit rate is 10 MHz and the total length of the bit sequence is 256 bits, which therefore corresponds to a light travel time of 7.68 km. The distance measurement from the satellite to the receiver is not uniquely specified, but rather can only be expressed as 7.68n+d km, where d is determined by the relative timing of the spreading code as broadcast and as received, but n is an unknown integer. There are various ways in which the ambiguity as to the value of n can be resolved, including using signals from a larger number of satellites, or by using knowledge of an approximate position derived from some other source. One common approach is to relate the code phase to the bit edge of the navigation data bit (this process is called bit synchronization), and also to relate the bit edge to the time of week (ToW) contained in the navigation data transmitted by the satellite.

It will be appreciated that increasing the repetition length for the spreading code helps to reduce problems with ambiguous distance determinations. A longer length for the spreading code also provides better separation of signals from different sources, and increased robustness against interference. On the other hand, having a longer repetition length for the spreading code may delay initial acquisition of the signal, as well as requiring more processing capability within the receiver. One known strategy to counter this problem is to use a hierarchical spreading code based on primary and secondary codes. If we assume that the primary code has N1 bits and the secondary code has N2 bits, then the first N1 bits of the overall spreading code correspond to the primary sequence exclusive-ORed with the first bit of the secondary code, the next N1 bits of the spreading code comprise a repeat of the N1 bits of the primary code, this time exclusive-ORed with the second bit of the secondary code, and so on. This gives a total repetition length for the code of N1×N2. However, the repetition length for synchronisation purposes is only N1, since the primary code will still give a correlation peak irrespective of the value of the bit from the secondary code (this will just change the sign of the correlation peak).

The GPS spreading codes are implemented using linear feedback shift registers (LFSRs), in which selected outputs from an N-stage shift register are tapped and fed back to the input. The feedback connections within the LFSR can be represented as a polynomial of order N, whereby the operation of an LFSR can be fully specified by its polynomial and the initial setting of the LFSR.

GPS uses a subset of LFSRs known as Gold codes that have certain special mathematical properties. One of these is that they generate an output of pseudo-random noise having a maximal repetition length of $2^N-1$, so that a relatively compact LFSR can generate an output with a long repetition length. Gold codes also have good auto-correlation properties that support accurate positioning. In particular, the autocorrelation function has a well-defined peak at zero time shift, and is relatively small for all other (i.e. non-zero) time shifts. It is also possible to select a set of Gold codes that have good cross-correlation properties, whereby the cross-correlation function between different codes is kept relatively small. This is important for signal acquisition, since it helps to prevent a synchronisation code from one satellite being accidentally mistaken for a synchronisation code from another satellite. A further important practical criterion for a spreading code is to have equal (or nearly equal) numbers of ones and zeros—this is referred to as balancing.

Additional information about satellite navigation systems, and in particular about GPS, can be found in: "Re-Tooling the Global Positioning System" by Per Enge, p 64-71, Scientific American, May 2004, and in "Global Positioning System: Signals, Measurements and Performance", by Misra and Enge, Ganga-Jamuna Press, 2001, ISBN 0-9709544-0-9. Information about the proposed Galileo signals can be found in: "Status of Galileo Frequency and Signal Design" by Hein et al, September 2002, available from: http://europa.eu.int/comm/dgs/energy_transport/galileo/doc/galileo_stf_ion2002.pdf, see also "Galileo Frequency and Signal Design" by Issler et al, GPS World, June 2003, available from: http://www.gpsworld.com/gpsworld/article/articleDetail.jsp?id=61244.

Although the use of Gold codes is well-established for existing satellite navigation systems, there are some limitations associated with such codes. For example, they are only available with certain code lengths (not all values of N can be used for the LFSR polynomial). In general, the code length is determined by the ratio of the chip rate of the spreading code and the bit rate of the navigation data. If the code length is restricted to an available Gold code, then this implies a constraint on the chip rate and the bit rate, which might in turn impact other considerations, such as acquisition time and positioning accuracy. In some cases, the limitation on code length for Gold codes has been overcome by using truncated Gold codes, but this truncation has an adverse impact on the mathematical properties of the code set (in terms of the auto-correlation function, etc).

In addition, the cross-correlation properties of Gold codes are not generally optimised for the situation where the polarity of the code changes from one repetition of the code to the next, in accordance with the navigation data that is being transmitted. This latter problem is exacerbated where the bit rate of the navigation data is relatively high (as for Galileo), since this leads to a significant probability that a spreading code transmission has the opposite polarity from the immediately preceding transmission of the spreading code.

SUMMARY OF THE INVENTION

Accordingly, one embodiment of the invention provides a method for creating a set of spreading codes for use in a satellite navigation system comprising a constellation of satellites. Each satellite in the constellation is to be allocated a spreading code from the set of spreading codes. The method comprises generating an initial set of bit patterns, wherein each bit pattern represents a potential spreading code, and then performing an optimisation process on the initial set of bit patterns. In the optimisation process, at least some of the bit patterns in the initial set are modified or replaced in order to create a final set of bit patterns for use as the set of spreading codes.

Such an approach therefore avoids the use of codes generated from mathematical algorithms in favour of codes created as bit patterns via an optimisation process. Such codes may have a typical length of 1000-10000 bits for use in satellite navigation systems, but other code lengths can be created if so desired. Indeed an arbitrary code length can be selected for the codes in order to best suit the other operational requirements of the system, rather than having to select a code length that satisfies a particular mathematical algorithm.

In one implementation, each bit pattern in the initial set of bit patterns is generated as a random sequence of bits. The individual initial bit patterns may be modified prior to optimisation to enforce certain criteria—for example that the bit patterns are balanced and that the first auto-correlation side-lobes for each bit pattern are zero. The optimisation process can then be arranged to leave these properties invariant, thereby ensuring that the final set of code patterns are also balanced and have auto-correlation side-lobes set to zero. Other criteria that might be enforced in this manner include the maximum run length of a particular bit value (either one and/or zero). Alternatively, such criteria might be incorporated into the overall optimisation process, rather than being addressed as preliminary conditions.

In one embodiment, the optimisation process seeks to minimise a cost function for the set of bit patterns. The cost function may be based on the auto-correlation and cross-correlation values for the set of bit patterns, including both odd and even auto-correlation and cross-correlation values (to accommodate possible reversals in polarity between successive cycles of a spreading code). The cross-correlation values are calculated for all possible offsets between the bit patterns. In general, better convergence of the optimisation procedure is obtained if the cost function is based on multiple correlation values (rather than for example just the worst correlation value in any given set of bit patterns). In one particular implementation, the cost function is based on a summation of all auto-correlation and cross-correlation values greater than a predetermined bound, such as the Welch bound (or some multiple thereof).

In one embodiment, the bit patterns are modified during the optimisation process by randomly flipping bits in at least one of the bit patterns. The bit modifications are reversed if it is found that they lead to an increased cost function (thereby ensuring that the set of bit patterns does not deteriorate). The number of bits flipped may be decreased as the cost function decreases, thereby providing a more sensitive search around a cost function minimum.

It will be appreciated that there is a wide variety of known optimisation strategies, such as simulated annealing, genetic algorithms, and so on, and any suitable such strategy may be employed to create the final set of bit patterns. In some of these strategies, the optimisation may involve the generation of a larger population of bit patterns followed by selection of the best examples (survival of the fittest), rather than continuous modification of individual bit patterns within a predetermined set.

Another embodiment of the invention provides a receiver incorporating a final set of bit patterns created using a method such as described above. In one implementation, the bit patterns may be protected by an error-correcting code, and may be stored in a read only memory (ROM) or in a programmable read only memory (ROM). Note that the latter option allows the bit patterns to be updated if so desired. It will be appreciated that other forms of storage may be used to hold the bit patterns, which are relatively small—each pattern is typically less than 1 kByte (although the random nature of the bit patterns implies that a more compact or compressed representation is not available, in contrast to the situation with Gold codes).

In some implementations, the receiver may incorporate bit patterns for at least two satellite constellations, where one of the satellite constellations comprises GPS. Note that the GPS spreading codes are Gold codes, and are normally generated within a receiver using a linear feedback shift register. However, the present approach can in effect be retrofitted to GPS systems, thereby allowing a single approach to be used for multiple satellite navigation systems.

In some implementations, the bit patterns for use by a receiver may be stored in a removable memory device. This can facilitate update of the codes used by the receiver, by replacing the removable memory device with a new version that contains updated codes. In other implementations, the receiver may be able to access (updated) codes over a network such as the Internet. These codes can then be downloaded to the receiver to allow acquisition of the satellite positioning signals. With this latter approach, the codes need not necessarily be stored in the receiver itself, but rather can be accessed as and when required over the network.

Another embodiment of the invention provides a method of operating a receiver for use in conjunction with a satellite navigation system. The method comprises accessing a set of stored bit patterns that correspond to spreading codes used by the satellite navigation system. The method further comprises using the stored bit patterns to acquire signals from the satellite navigation system. The stored bit patterns may also be used to perform position determination in relation to the signals from the satellite navigation system.

Another embodiment of the invention provides a method of operating a satellite comprising part of a satellite navigation system. The method includes storing within the satellite at least one bit pattern corresponding to a spreading code; retrieving the bit pattern to generate a signal incorporating the spreading code; and transmitting the signal. The same method can be applied to a pseudolite (a ground-based transmitter than emulates a satellite in a satellite navigation system).

In one implementation, the retrieving includes performing an error correction code (ECC) check on the stored bit pattern. This can be useful to detect and, if possible, to correct any errors that have arisen in the stored bit pattern (for example due to a cosmic ray hit). The bit pattern may be stored in a programmable read only memory (PROM), which then allows updating of the stored bit pattern as appropriate. For example, the updating may be performed in response to a detected error in the stored bit pattern or to avoid interference of the spreading code corresponding to the stored bit pattern. Another possibility is that the updating is done to restrict the set of users that can access the spreading code from the satellite (either for commercial or security reasons).

The approach described herein therefore stores an entire spreading code in a memory device, such as a register, rather than using a linear feedback shift register (LFSR) for code generation. Such a memory device is present in both the satellite payload, for code transmission, and also in receivers, for code receipt. The code is read out from the memory device bit for bit, in contrast to being generated in accordance with some mathematical algorithm. This allows any form of code to be utilised—in particular, the code is not required to be some kind of Gold code, a partial Gold code, a short cycled Gold-code or a combination of such codes. The codes can actively be optimised for desired properties, such as minimal side-lobes in the auto-correlation function (ACF) and minimum cross-correlation with other codes. Minimal side-lobes lead to a better acquisition properties, for example, the signal can be acquired more easily under poor reception conditions, such as indoors and under tree foliage, while minimum cross-correlation with other codes reduces multiple access interference and intra-system noise, thereby increasing the robustness of signal acquisition, tracking, and data demodulation. In addition, the codes can be constructed such that the balance is always perfect, and the first side-lobe of the ACF is fixed to zero. This latter property implies that the shape of the ACF in the region $-Tc$ to $Tc$ is always the same (where $Tc$ represents the chip or bit length in the code). The codes provided are compatible with the use of codes having a hierarchical structure—i.e. based on primary and secondary codes. For example, a code provided in accordance with one embodiment of the invention may be used as the primary code for a tiered code, thereby providing fast acquisition while maintaining good correlation properties.

The approach described herein allows a decision on the final form of the spreading codes to be delayed until a very late stage of system development, since the hardware (e.g. a memory device) will not normally be specific to a given code (unlike a particular LFSR). Furthermore, the memory can accommodate a new spreading code to be broadcast from a satellite in orbit by loading the new code into the memory. This can be useful for in-orbit testing of codes during the last phase of implementation or commissioning, or if it is necessary to transmit a different code from that originally planned, for example because of interference with other services, or because certain slots have been re-allocated. In addition, the revision of codes may also be useful for commercial purposes, if perhaps a license payment is required to obtain the new codes, or for security reasons, to limit access to positioning services to those in possession of the new codes.

Note that although the approach described herein is primarily intended for use in satellite navigation systems (including pseudolites), it could also be employed in other navigation or communication systems (satellite, terrestrial or maritime) that have previously used LFSRs to generate synchronisation codes and such-like.

BRIEF DESCRIPTION OF THE DRAWINGS

Various embodiments of the invention will now be described in detail by way of example only with reference to the following drawings.

DETAILED DESCRIPTION

In contrast to prior art techniques for finding spreading codes, which are based on codes derived from mathematical algorithms, the present approach uses spreading codes that do not adhere to any particular formal mathematical structure. Rather, spreading codes having arbitrary bit sequences are permitted, and an attempt is made to determine an optimum set of spreading codes to use based on one or more objective criteria.

Note that for spreading codes of a length typically used in satellite navigation systems (say 1000 bits or more), the number of possible codes is very large (once constraints as to mathematical structure are removed). For example, for a code period of length N bits, the total number of balanced bit sequences can be specified as:

$$\binom{N}{N/2} \approx 2^N \sqrt{\frac{2}{N\pi}} \quad \text{(Eq. 1)}$$

which for N=16,384 bits corresponds to ~$10^{4930}$ (far more than the 8192 Gold codes of length 16,384 bits). This very large number of possible balanced codes implies that an exhaustive examination of all possible code sets is not computationally feasible. Rather, the present approach adopts some form of optimisation procedure, as described in more detail below.

The number of codes to be included within a given code set is dependent upon the particular requirements of the satellite navigation system. Such systems are generally designed to operate with some 24-30 different satellites, plus usually there are potential spares in case of failure. The desired number of codes within a code set may be further increased to accommodate "pseudolite" signals. These are signals emitted from ground locations, for example near airports, that appear to a receiver as additional satellite navigation signals, and so can give more precise and reliable position determination in such locations. In addition, it may be desired to change the set of spreading codes broadcast from a satellite on a regular basis. This can be useful for security or commercial reasons, for example where access to the new codes is conditional upon payment of a license fee, or is restricted to certain sets of government or military users.

Figure 1:
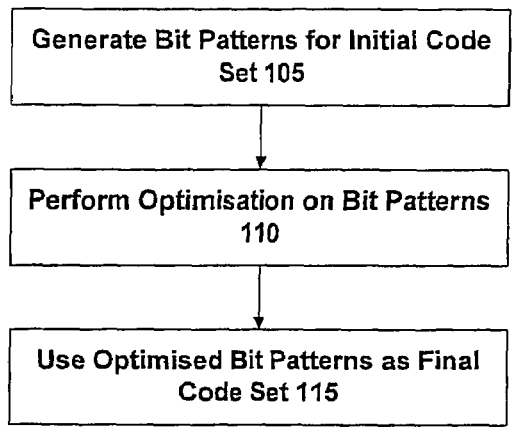
FIG. 1 is a high-level flowchart of a method for generating a code set in accordance with one embodiment of the invention.

FIG. 1 is a high-level flowchart of the method used to generate code sets in accordance with one embodiment of the invention. The method commences with the generation of an initial set of bit patterns (105). Each bit pattern represents a potential spreading code for use by a satellite. The bit patterns are then modified in accordance with an optimisation process (110). The set of bit patterns remaining at the end of the optimisation process then represents the code set for use by the satellites (115).

Figure 2:
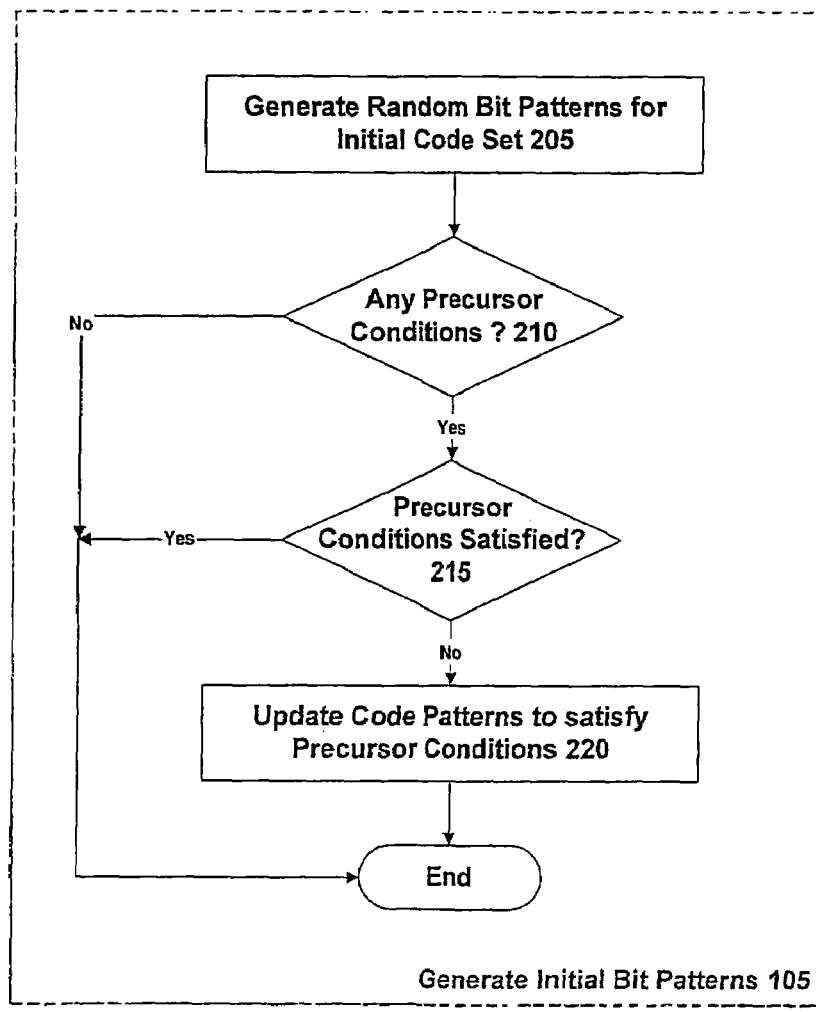
FIG. 2 is a high-level flowchart illustrating in more detail the initialisation process from the method of FIG. 1 in accordance with one embodiment of the invention.

FIG. 2 is a high-level flowchart illustrating in more detail the method used for the generation of the initial set of bit patterns (corresponding to operation 101 in FIG. 1) in accordance with one embodiment of the invention. The method starts with the generation of a set of random bit patterns for the initial code set (205). In one particular implementation, the number of bit patterns generated for the initial set corresponds to the number of spreading codes that are ultimately desired. However, as will be discussed below, other implementations may take a larger starting set of bit patterns. Note that because the bit patterns are generated on a random basis rather than by using some specific mathematical algorithm (such as for the Gold codes), the bit patterns can be of arbitrary length. This length can therefore be selected in accordance with the particular operational needs of the satellite system (e.g. acquisition time, positional accuracy), rather than being dictated by the selected code format.

In one particular implementation, the initial bit patterns are generated by providing a seed to a (pseudo-) random number generator. The seed used to create each bit sequence is written to a log-file, so that the process can be deterministically repeated if desired. This implementation also allows the initial set of codes to be loaded from a file (rather than being generated on a random basis). This is convenient if a new search is to be started using the results from a previous search as the starting point.

The procedure of FIG. 2 now determines whether or not there are any precursor conditions to be imposed on the code set (210), and if so, whether or not these precursor conditions are satisfied (215). If there are precursor conditions that are not satisfied, then the bit patterns may be modified to ensure that the precursor conditions are satisfied (220), prior to starting the main optimisation process.

In one particular embodiment, two precursor conditions are applied to the initial bit patterns. The first of these is that the code is balanced—in other words, there are equally many 1s and 0s in the code. Assuming that A equals the number of 0s in a bit pattern and B equals the number of 1s, the test at operation 215 therefore determines whether A=B. If so, then operation 215 has a positive outcome, and no further action is required (in respect of this particular precursor condition). On the other hand, if it is found at operation 215 that A>B, then in operation 220, (A−B) zeros are randomly selected from the bit pattern and flipped from 0 to 1, thereby producing a balanced code. Conversely, if B>A for the initial random bit pattern, then at operation 220 (B−A) ones are randomly selected from the bit pattern and flipped from 1 to 0, again producing a balanced code.

The second precursor condition applied to the initial bit patterns is that the first side-lobe (i.e. corresponding to a bit shift of one place) of the auto-correlation function (ACF) is zero for each bit pattern. This is a useful property since it ensures that the ACF has a known (fixed) behaviour in the vicinity of zero-offset, which has implications for the receiver S-curve. For example, the fact that the true (clean) ACF goes from unity at zero offset down to zero at the first side lobe may be used in certain multipath mitigation techniques, where an estimate of the amount of interference present can be based on the level of any signal detected in the first side lobe. Multipath effects for the Galileo system are discussed in "Effects of Masking and Multipath on Galileo Performances in Different Environments" by Malicorne et al, available from: http://www.recherche.enac.fr/ltst/papers/saint_petersburg01.pdf).

In order to obtain the desired ACF for each bit pattern, operation 215 of FIG. 2 therefore determines the first side-lobe of the ACF for each bit pattern. For those bit sequences where the ACF is non-zero at the first side-lobe, the bit pattern is modified to obtain the desired ACF (220). In one particular implementation, this is achieved by flipping a randomly chosen '1' and a randomly chosen '0' until the first ACF side-lobe is zero. It will be appreciated that flipping pairs of bits in this manner ensures that the bit pattern remains balanced while the desired ACF is obtained. Other embodiments may adopt a different (possibly more structured) approach to zero the first ACF side-lobe instead of the random selection of bits to flip as described above (although in practice the performance of the latter technique is satisfactory).

The two precursor conditions described above are both "local" in that they relate to an individual code, rather than being dependent on multiple different bit patterns. Accordingly, it is convenient to address them during an initialisation phase, such as shown in FIG. 2, prior to the optimisation process of operation 110 (see FIG. 1). However, in other embodiments, one or more of the above precursor conditions may be incorporated into the optimisation phase, as another component of the cost function for evaluating codes (see below). In addition, the precursor conditions to be applied may vary from one embodiment to another. For example, some satellite systems may not need a balanced spreading code or a zero at the first ACF side-lobe. In some embodiments, it may be desirable to impose an upper limit on the number of consecutive bits of the same value (e.g. no more than say L consecutive 1s or L consecutive 0s). Yet a further possibility is to impose a hierarchical structure onto the codes, so that they are formed from the combination of randomly generated primary and secondary codes.

Figure 3:
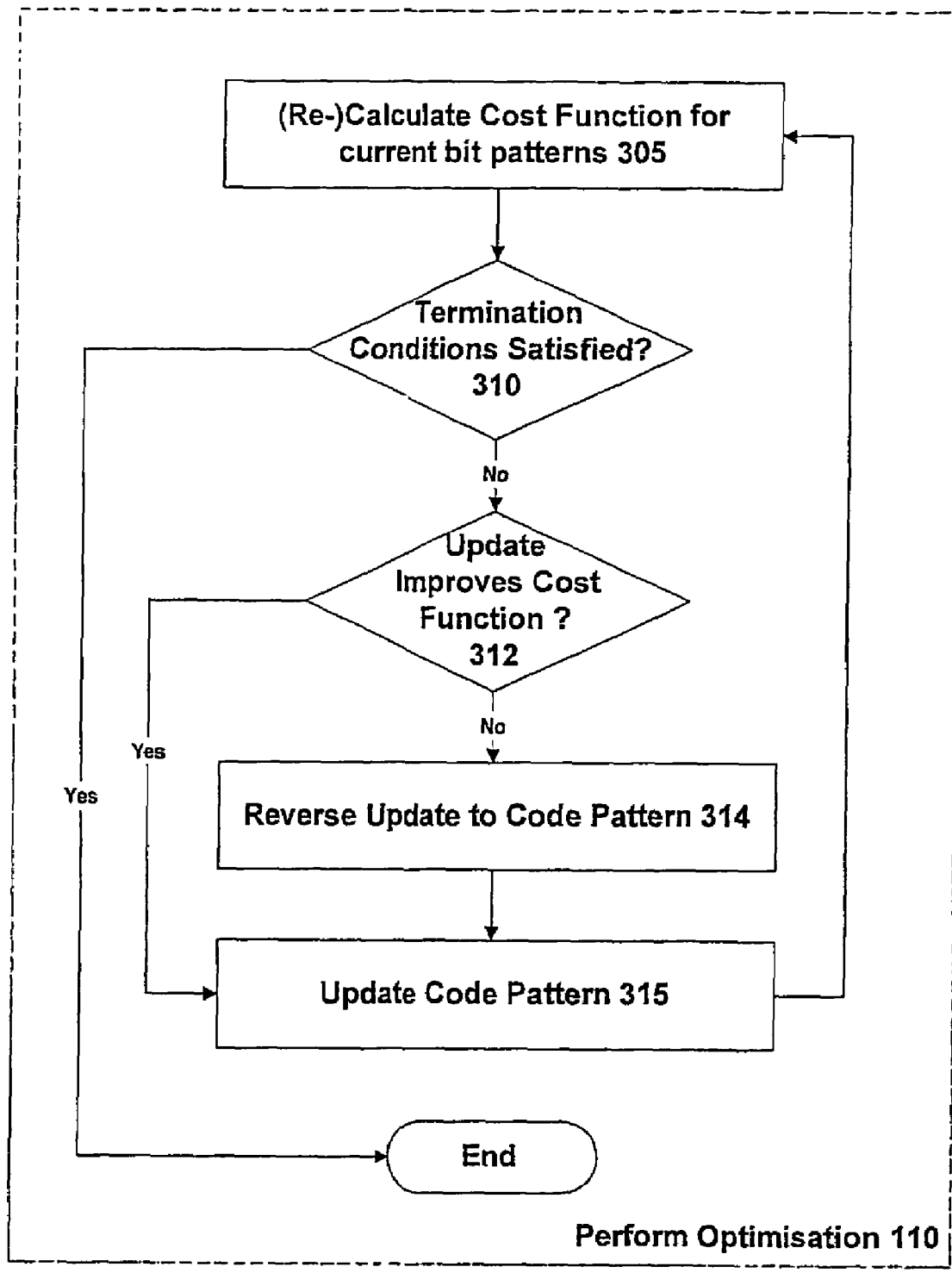
FIG. 3 is a high-level flowchart illustrating in more detail the optimisation process from the method of FIG. 1 in accordance with one embodiment of the invention.

FIG. 3 illustrates at a high level the optimisation process corresponding to operation 110 from FIG. 1. At a high level, this involves calculating a cost function for the current bit patterns (305) and determining whether a termination or convergence condition has been satisfied (310). If so, the optimisation has completed, but if not, then at least one of the code patterns is updated (315), and we return to operation 305 to calculate the cost function for the updated set of bit patterns.

In one implementation, the cost function is determined based upon the even and odd auto/cross-correlation functions, which are defined respectively as follows:

$$X^{a,b}_{k,e} := \sum_{n=0}^{N-1} a_n b_{n-k} \text{ and } X^{a,b}_{k,o} := \sum_{n=0}^{N-1} a_n b_{n-k} \sigma(n-k) \quad \text{(Eq. 2)}$$

where a and b are code sequences, k is the offset, N is the number of bits in the code and σ is the sign function, such that σ(n)=−1 for n<0; and σ(n)=+1 for n≧0. If a=b, then the auto-correlation function is obtained. (Note that these formulae assume that the code patterns are expressed as cyclic sequences, with each chip represented as +1 or −1 as appropriate; the correlation values obtained are not yet normalised into the range −1 to +1).

The even ACF and CCF correspond to what might be considered as the conventional ACF and CCF. The odd ACF and CCF reflect the possibility that successive cycles of a code pattern may flip in polarity. One reason for such a flip in polarity might be that the bit pattern forms the primary code of a hierarchical code, as described above, and is therefore flipped in accordance with the secondary code. Another reason might be that the flip is caused by multiplexing the spreading code and the navigation data onto the same channel. The odd ACF and the even ACF are determined for every bit sequence in the code set for every possible shift value. The odd CCF and the even CCF are determined for every pair of bit sequences in the code set, and for every possible shift value between the two bit sequences in the pair.

In one implementation, all the correlation functions are evaluated with a straightforward time-domain method (rather than converting to the frequency or Fourier domain). As explained in more detail below, the time taken for such calculations is not so important, since the full evaluation of the CCF and ACF is only done for the first calculation of the cost function, but not at subsequent stages of the optimisation process.

A variety of cost functions may be derived from the odd and even ACF/CCFs as calculated above. One possible cost function is based on the maximum CCF peak between two different bit patterns, and can be specified as:

$$M := \max_{\substack{a,b,k \\ \lambda \in \{o,e\}}} \{|X^{a,b}_{k,\lambda}|\} \quad \text{(Eq. 3)}$$

Here a and b represent different codes, k represents the offset between the two codes, and o and e represent odd and even versions of the correlation function. The value of M has been frequently used in previous projects as a metric to evaluate code sets, and gives an indication of how likely it is that the spreading code from one satellite might be mistaken for the spreading code from another satellite. However, one deficiency of this metric is that it does not take into account how many times the maximum correlation value occurs. For example, if a given peak occurs only once for a single pair of code patterns and a single shift, then this might be much more acceptable than if the same peak occurs for multiple pairs of code patterns and at multiple shifts, since in the latter case the probability of a mistaken identification at the receiver is much greater.

In addition, the convergence properties of an optimisation process based on the value of M alone are relatively poor. Thus since the maximum CCF peak depends on only one value, as the optimisation algorithm converges it soon becomes unlikely that a random change in the code bits will result in a decreased cost. If there are many peaks with the same maximum value this problem is even more pronounced.

Another possible cost function is the Sum of the absolute value of all the cross-correlation peaks to the power of n:

$$S_n := \sum_{\substack{a,b,k \\ \lambda \in \{o,e\}}} \left(X^{a,b}_{k,\lambda}\right)^n \quad \text{(Eq. 4)}$$

where practical tests have shown that suitable values of the power n include 2 and 6. This has the advantage compared to using just the peak cross-correlation value (M) that it depends on many more values (indeed every single possible correlation value), and so generally exhibits better convergence properties.

A further possibility for the cost function is derived from the Welch bound, which is defined in the literature as $$WB = N\sqrt{\frac{M-1}{MN-1}} \quad \text{(Eq. 5)}$$

where M is the number of sequences, and N is the length of the sequences. The Welch bound can be used to specify the Welch excess criteria, which is defined by the following equation:

$$We_n := \sum_{\substack{a,b,k \\ X > WB \\ \lambda \in \{o,e\}}} \left(X_{k,\lambda}^{a,b} - WB\right)^n \quad \text{(Eq. 6)}$$

This is basically a sum of all the ACF and CCF peaks (both even and odd) that are above the Welch bound (those that are below the Welch bound are discounted from the summation). In particular, the Welch bound is subtracted from each of the peaks and the residual taken to the power of n, where n is configurable, and appropriate values from experience have been found to include 2, 6 or 8. The $We_n$ cost function excludes low-level correlation values from the optimisation, and so can be seen as a compromise between the use of $S_n$ as a cost function, which incorporates all correlation values, and M, which incorporates only the peak correlation value.

It will be appreciated that although $We_n$, M and $S_n$ represent possible cost functions for use in operation 305 (and $We_n$ has been found particularly suitable), other implementations may use other cost functions or combinations of cost functions. Each selected cost function will lead to different codes in a different manner. One option might be to say that a code is good if the maximum side-lobe is small, while another option might be to say that a code is good if the sum of all side-lobes is small. A combination of more than one cost function (such as requiring both the maximum side-lobe and the sum of side-lobes to be small) is also possible. The cost functions may be based on the correlation functions and/or on some other metric. For example, having an approximately balanced code may be included as part of the cost function for optimisation, rather than being imposed as an initial condition. Also, depending upon the signal structure to be employed, the odd correlation functions might not be of interest (especially if the same polarity of the spreading code is maintained throughout).

It will also be appreciated that the cost function selected may not coincide exactly with the final selection criteria for determining the eventual code set. This is because the cost function will generally be selected to provide good convergence, and this can generally be helped by having the cost function depend on a significant fraction of the CCF peaks, even if the ultimate evaluation criteria may depend on only a single peak CCF value.

In the present implementation, the cost function evaluates the cross-correlation functions only at zero Doppler (i.e. ignoring any possible Doppler shift in the signals arising from the motion in space of the satellites). The main reason for this is an empirically observed phenomenon for code sets that have an approximately Gaussian distribution of cross-correlation peaks, in that it is observed that on average the histogram of CCF peaks tends to shift towards zero for non-zero Doppler conditions. (Note that in contrast Gold codes have a highly non-Gaussian distribution of cross-correlation peaks, and accordingly the effect of non-zero Doppler conditions may be more significant for this class of codes).

The determination of when the optimisation process has concluded at operation 310 can be made in accordance with various criteria, such as because the total number of trials (i.e. loops through the processing of FIG. 3) has reached some preset limit, or because the cost function has reached some acceptably low level. Another possibility is that the optimisation procedure has reached a convergence at some cost function minimum. It will be appreciated that one standard problem in optimisation procedures such as that shown in FIG. 3 is that the cost function gets stuck in a local minimum, and there is no way out when taking small steps. However, in the present application the cost function lives in a very high dimensional space (lots of bits within each bit pattern, and lots of bit patterns). It is therefore very probable that there is some way out of any local minimum, because the large number of dimensions offers many directions in which to explore by choosing different updates to the code patterns.

If the outcome from operation 310 is negative, in that the optimisation is to continue, then the code patterns are updated (315) (we will come back to operations 312 and 314 later). In one embodiment, this is achieved by randomly flipping a certain number of bits in a code. The number of bits to be flipped may depend on how good the codes have become (i.e. how low the cost function is). In general, as the codes become better, and the cost function becomes lower, the number of bits to flip may be reduced. This then allows a coarser search of the optimisation space when relatively far away from a minimum of the cost function, and a finer search of the optimisation space as a minimum is approached.

In one implementation, the identity of the code pattern to modify may be selected at random. Alternatively, there may be some specific reason for selecting a code pattern to modify. For example, the code pair that produced the (or a) maximum correlation peak may be selected for updating in preference to the other codes.

In one particular embodiment, a test is made at operation 312 to confirm that the change of bits at operation 315 led to an improvement (i.e. a reduction) in the cost function. If this is found not to be the case, then the bits are reverted back to the previous position (operation 314), in other words the update of operation 315 is reversed, and new pairs of bits are selected for flipping in the next update (operation 315). It will be appreciated that the presence of test 312 and operation 314 ensure that the optimisation process does not go backwards, in the sense of making the cost function larger rather than smaller.

The optimisation may be performed subject to certain precursor conditions, which in one embodiment are that the codes are balanced and have a zero at the first ACF side-lobe (as previously discussed in relation to FIG. 2). Once the precursor conditions (if any) have been established, the method of updating the code patterns at operation 315 can be selected so that these properties are maintained invariant. In one implementation this is achieved as follows:

Balance invariance: the bits are always flipped in pairs within each code by selecting one bit with value 0 to flip and one bit with value 1 to flip. This ensures that the code is modified in a balance invariant way, so that the balance of the code remains the same before and after flipping the bits. Thus, if the codes are balanced when they are initialized (as at operation 220), they remain balanced throughout the entire optimization procedure.

ACF side-lobe invariance: assuming that the bits selected for flipping are $a_j$ and $a_k$, which for balance invariance implies that: $a_k = -a_j$, then it is easy to show that the first side-lobe of the ACF function is unchanged providing:

$$a_{k-n} + a_{k+n} = a_{j-n} + a_{j+n} \quad \text{(Eq. 7)}$$

If equality this does not hold, then new bits $a_j$ and $a_k$ for flipping must be selected in order to preserve the zero value of the first ACF side-lobe. More generally, if during initialisation (see FIG. 2), the codes have been constructed such that the nth side-lobe of the ACF is zero, then this can be preserved by ensuring that:

$$a_{k-n} + a_{k+n} = a_{j-n} + a_{j+n} \quad \text{(Eq. 8)}$$

Accordingly, the code update of operation 315 can be controlled to ensure that the central portion of the ACF (i.e. around zero offset) retains the same shape for all codes.

Other precursor or invariant conditions can be enforced as appropriate. For example, a limit may be placed on the maximum run-length of any single bit (1 or 0) in a bit pattern sequence. Another possibility is that the codes have a hierarchical structure. In this case, the update operation 315 may involve separate modification of the primary and/or secondary portion of the code, and then generation of a new (full-length) code pattern from the primary and secondary codes (as modified).

A further criterion that may be applied either as a precursor condition or as part of the optimisation procedure reflects the fact that the Galileo system will feature a pilot signal similar to the coherent carrier in GPS L5. On GPS L5 this is achieved by transmitting two signals in quadrature (on the I- and Q-channels). In such circumstances, it is important that the signals are separated not only by the orthogonality of the carriers, but also by the codes themselves, in other words that the codes for the I- and Q-channels have a cross-correlation for zero delay that is as small as possible (it will be appreciated that the time delay between these two channels is fixed). The optimisation procedure described herein allows the cross-correlation of two such overlaid channels for exactly zero delay to be forced towards (or constrained to be) zero, i.e. $-\infty$ dB (compared to approximately $-60$ to $-70$ dB for the GPS L5 code). It will be appreciated that one way of modifying the CCF between two codes is to shift the start of one code relative to the other (using the cyclic nature of the codes), rather than modifying the bit sequence of either of the individual codes.

Note that after the code patterns have been updated at operation 315, a complete new calculation of the ACFs and the CCFs in order to update the cost function is not required if only a small number of bits have been flipped in each iteration. Rather, if two bits in a code having the opposite sign (to preserve balance) are flipped, say $a_j$ and $a_k$, the change in the even cross-correlation function is given by:

$$\Delta X_e^{a,b}(j,k,n) = -2a_j(b_{i-k} + b_{j-k}) \quad \text{(Eq. 9)}$$

where n is the offset between codes a and b. This update can then be applied to the already calculated CCFs. Similarly, for the odd CCFs we obtain $$\Delta X_o^{a,b}(j,k,n) = -2a_k(\sigma(k-n)b_{k-n} + \sigma(j-n)b_{j-n}) \quad \text{(Eq. 10)}$$

which again can be used to update the previously calculated odd CCF values.

The above procedure describes one optimisation procedure, but it will be appreciated that there are many alternative strategies available, based on concepts such as genetic algorithms, simulated annealing, and so on. For example, one possibility for update operation 315 is that rather than relying upon random modification of a randomly selected code, an algorithm may make a more directed attempt to reduce the cost function. This might be achieved by selecting a code or pair of codes generating a high correlation value, and selecting for modification specific bits within these codes that contribute to the high correlation value. Another possibility is to exchange partial bit sequences between two or more different codes (such as in the breeding phase of genetic or evolution-based algorithms). It will be appreciated that some implementations may utilise some combination of random, directed and/or exchange modifications for operation 315, or perform different types of update for different optimisation cycles.

It will also be noted that in the procedure described above, the number of bit patterns generated for the initial code set corresponds to the number of bit patterns in the final code set (i.e. the latter is derived from the former by modification of the individual bit patterns that already exist in the code set). Other optimisation procedures may involve instead a larger population of bit patterns than are required for the final set. For example, if there are N code patterns in the final set, then a set of P code patterns might be generated initially (P>N). Each optimisation cycle could then involve retaining the best subset of (say) N code patterns, and then generating another P-N new code patterns for testing in conjunction with the retained subset from the previous cycle. Some optimisation strategies may combine this larger population approach with updating individual code patterns within the population.

One motivation for working with a large population of codes is if the N code patterns are already deployed on satellites, and it is desired to identify additional compatible code patterns that could be used on replacement satellites (or on related ground-based services). Note that the N original code patterns might have been generated by a different mechanism from that shown in FIG. 1 (e.g. they may be Gold codes), but this is transparent to the present approach, which is compatible with any existing code set.

It has also been assumed so far that there is a predetermined length for the code patterns in a code set. However, there may be some flexibility in the length of code pattern that is adopted. In this case, repeating the optimisation procedure with code sets of different lengths may be used to identify a code length that provides a code set having particularly favourable properties (i.e. a lower minimum cost function than code sets based on a different length for the code pattern).

For code patterns that have a very short bit length, it is computationally feasible to perform an exhaustive search of all possible code patterns. However, this is not possible with present-day computational resources for code patterns having lengths that are usually employed for satellite navigation signals (as will be apparent from Equation 1 above), and in these cases an optimisation procedure must be used instead.

Figure 4:
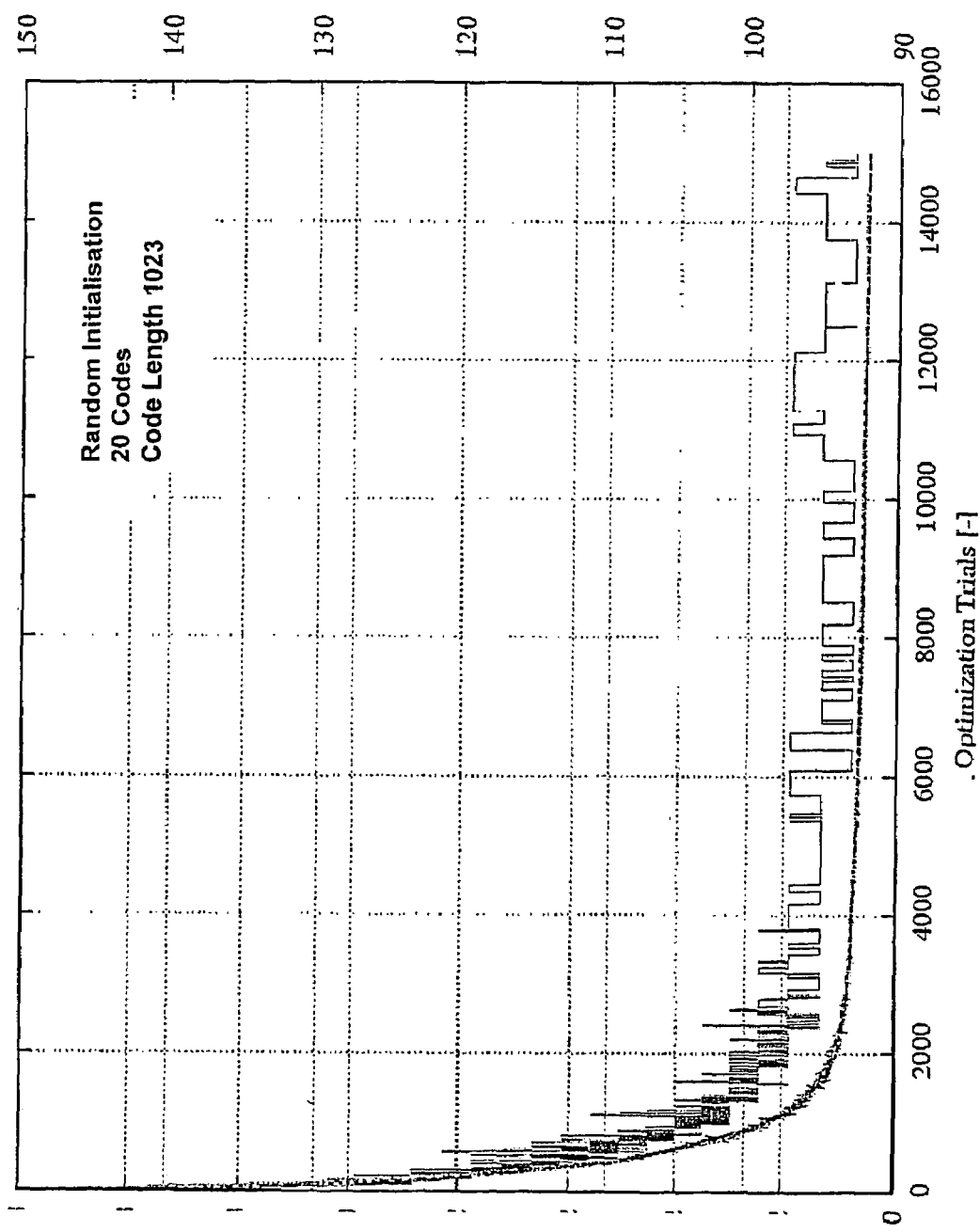
FIG. 4 is a plot showing the reduction in cost function with optimisation for a first set of codes in accordance with one embodiment of the invention.

FIG. 4 is a graph illustrating the progress of the code generation procedure of FIG. 1 in accordance with one particular embodiment of the invention. This example involves 20 codes, each of length 1023 bits. The initial bit sequences for the codes were generated at random, and the codes were then optimised as shown by the number of trials (i.e. number of code updates) along the X-axis. The graph plots four curves as a function of the number of trials. Three of these curves are largely superimposed on one another in FIG. 4, and so cannot be readily distinguished. These represent the value of a cost function calculated using the Welch bound—i.e. analogous to the cost function of $We_n$ from Equation 6 above. For this particular example, the cost function was determined as the $8^{th}$ moment (i.e. n=8) of all correlation values greater than 1.8 times the Welch bound (rather than 1.0 times the Welch bound as shown in Equation 6). The three curves calculated from the Welch bound correspond to: (a) the even correlation functions, (b) the odd correlation functions, and (c) the combination of both the odd and even correlation functions. It will be seen that the curves from the even and odd correlation functions track one another closely (and therefore so does the combined curve), with no important differences between them.

The fourth line in FIG. 4 represents the highest or peak correlation value, analogous to the value M from Equation 3 above. Note that this line is rectangular in form, and clearly quantised to certain values. In addition, the value of this line is constant at some stages over a significant number of trials. This confirms that the convergence or optimisation process will generally behave much better using the smooth curve for the value $We_n$ from Equation 6, rather than the value of M from Equation 3 (or analogues thereof).

Nevertheless, as previously mentioned, it is often the value of M that may be of ultimate interest for assessing the code set, since this determines the worst-case scenario for any misidentification. In FIG. 4, the scale of the Y-axis indicates the value of M (not that of W). The initial value of M is 149, and the final optimised value is 93. These are unnormalised figures, and for a code length of 1023, correspond to an initial value of 16.7 dB, and an optimised value of 20.8 dB (compared to the auto-correlation peak for zero offset—i.e. the signal at proper synchronisation).

Figure 5:
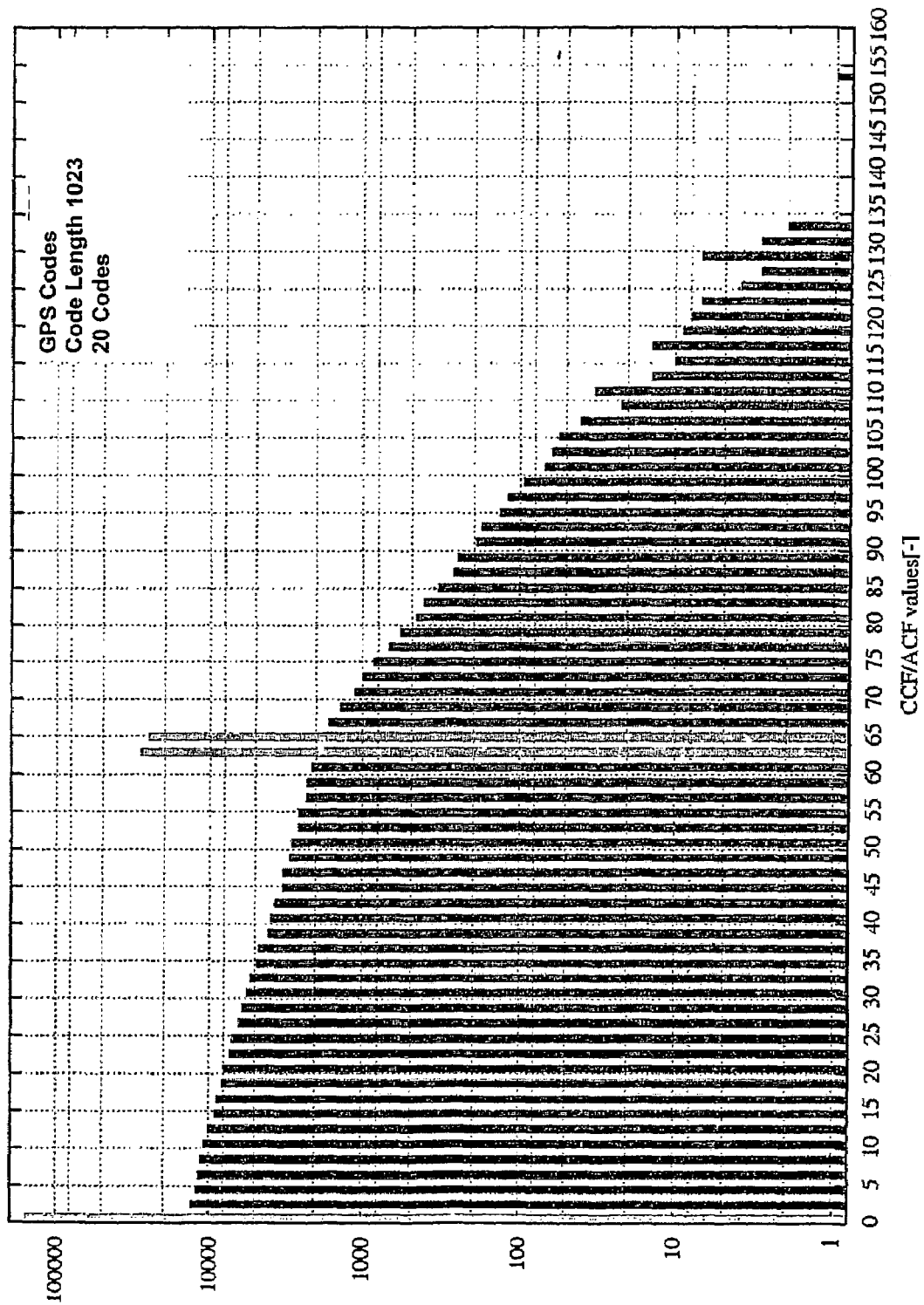
FIG. 5 is a plot showing the odd and even correlation values for a set of GPS codes.

FIG. 5 is a histogram of the (absolute) correlation values for a set of 20 codes, each of length 1023, that are used for GPS. The X-axis in FIG. 5 denotes a correlation value (the scale is therefore directly comparable with the Y-axis from FIG. 4), while the Y-axis denotes the number of combinations of codes and offsets that have this correlation value. The correlation values are split into odd correlations and even correlations. The even correlations comprise the very large peak at one, plus the two lesser peaks at 63 and 65. These correlation properties for the GPS Gold codes are well-known (see for example section 7.6 of the above-referenced book by Misra and Enge). The peak at 65 corresponds to a value of 24 dB below the autocorrelation peak for zero offset.

The remaining bars in the histogram of FIG. 5 represent the odd correlation values for the GPS Gold codes. These have a quite different distribution from the even correlation values, and are distributed across a wide range of values. The worst odd correlation value for the GPS codes is 153, corresponding to 16.5 dB, although this correlation value is significantly worse than the others (the second worst odd correlation value for the GPS codes is 133, corresponding to 17.6 dB).

Figure 6:
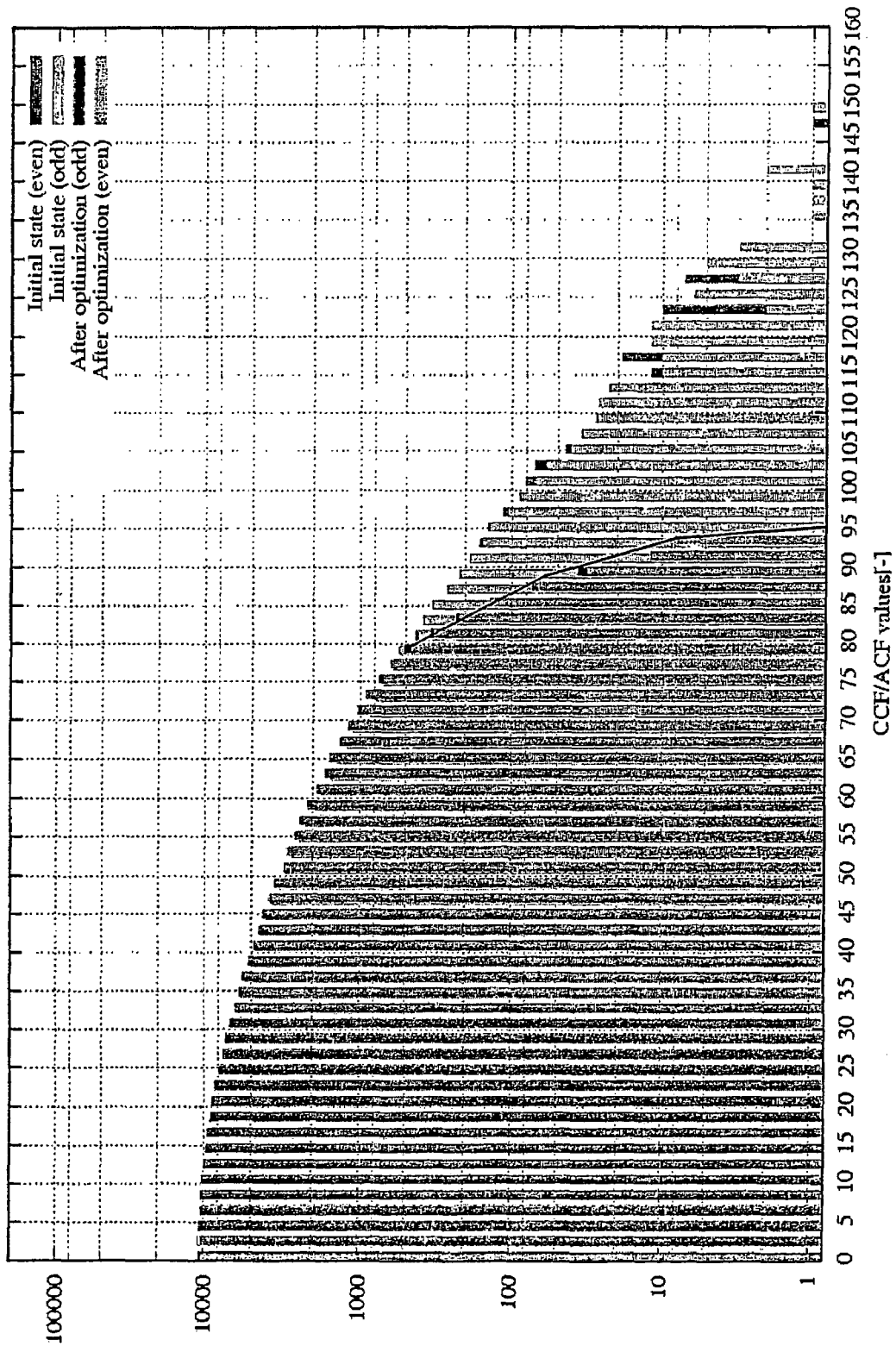
FIG. 6 is a plot showing the odd and even correlation values for the set of codes resulting from the optimisation of FIG. 4.

FIG. 6 is an analogous histogram to FIG. 5, but this time shows the correlation values for the code set derived from the optimisation shown in FIG. 4. FIG. 6 plots the correlation values separately for odd and even functions, and also for both pre-optimisation and post-optimisation code sets. Since these different sets cannot be easily distinguished per se, a line has been added to this histogram that terminates at a correlation value of 93. This represents the upper boundary of the histogram for the post-optimisation correlation values, whereas the pre-optimisation values extend significantly beyond this to an upper value of 149 (consistent with the plot of FIG. 4).

The optimisation process has therefore resulted in an improvement of over 4 dB between the initial and final states, which on a statistical basis corresponds to more than doubling the code length. Although the performance of the optimised codes for even CCF is still below that for Gold codes, the actual difference is somewhat less than indicated by FIGS. 5 and 6. This is because it has been found in practice that Gaussian histograms, such as shown in FIG. 6, tend to move to the left for non-zero Doppler, reflecting a decrease in correlation values. In contrast, sharp peaks, such as those shown in FIG. 5 at 63 and 65 for even Gold codes, tend to become smeared This then leads to an increase in the peak correlation value associated with these peaks.

Furthermore, the performance of the optimised codes from FIG. 6 for odd CCF is generally better than the performance of Gold codes for odd CCF (which is typically comparable to the initial state of FIG. 6). Note that in GPS, the data rate superimposed onto the spreading codes is relatively low, so that the probability of a bit-flip between codes is only 0.5/20 or 2.5%. The performance for odd CCF in GPS is therefore not so important. In contrast with Galileo, the data rate superimposed onto the spreading codes is relatively high, so that the probability of a bit-flip between codes is 0.5 (50%). It will be appreciated that in these circumstances, the performance for odd CCF is a much more significant factor.

In addition, in some circumstances, it may be desirable to use a truncated Gold code rather than a complete Gold code, in order to have a particular length of code. The performance, of such truncated Gold codes has been found to be generally similar to the initialised code set of FIG. 6, and so significantly poorer than the performance of the optimised code set of FIG. 6.

Figure 7:
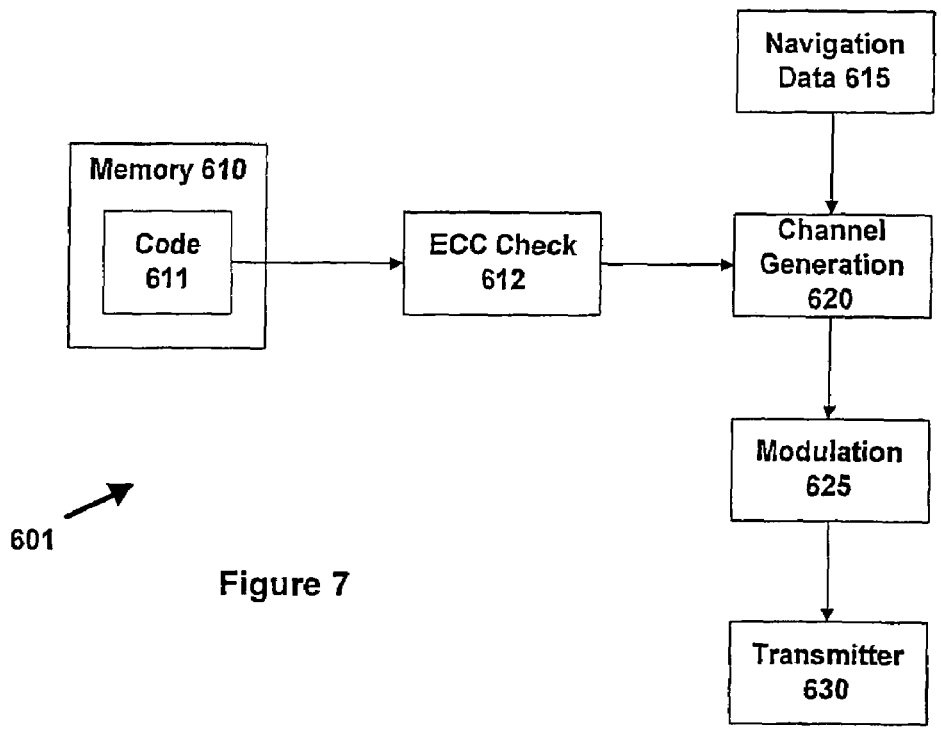
FIG. 7 is a high-level schematic diagram of a satellite system in accordance with one embodiment of the invention.

FIG. 7 is a high-level schematic block diagram of a transmission system 601 for use in a satellite payload in accordance with one embodiment of the invention. (It will be appreciated that an analogous structure could also be used in a pseudolite or other such device that emulates a satellite). The transmission system 601 utilises a spreading code 611 such as generated using the method of FIG. 1. The spreading code 611 is stored in a memory device 610, which in normal broadcast activities functions as a read-only memory. In one implementation memory device 610 may be operated from a logical perspective as a circular buffer, using a read pointer to cycle around the stored code sequence 611 (this may be simpler to implement than the conventional LFSR design, which requires multiple read-write operations for each output bit).

In a typical satellite navigation system, the length of code 611 is of the order of 1000 to 10000 bits, although longer or shorter codes may be used if appropriate. Note that in some circumstances code 611 may comprise a hierarchical code, in which case memory device 610 may be split into two components, one for storing the primary code, and one for storing the secondary code. In such a situation, the transmission system 601 would also include suitable logic for generating the complete code from the stored primary and secondary codes. Alternatively, even if code 611 has a hierarchical structure, it may still be stored as one single, long sequence in memory 610. Having such a flat structure in memory is useful, for example should it be desired to replace the code 611 in memory 610 with some different code (see below).

The feature size of modern memory devices is very small. The stored bits in memory 610 may therefore be vulnerable to cosmic ray hits (especially in a space environment) and other possible contamination. Accordingly, in one embodiment, the output of memory device 610 is passed through an error correction code (ECC) unit 612 to protect the accuracy of code 611. The ECC unit 612 is able to detect an error in code 611 as read out from memory 610, and may be able, in some circumstances, to automatically correct the error (depending upon the nature of the code and the error). For example, memory 610 may store two copies of the code 611, and read each bit simultaneously from both copies. If the two bits read from the different versions disagree, this signals (i.e. detects) an error in one of the stored versions. If three copies of the code 611 are stored in memory 610, then any detected error may be corrected automatically on the basis of majority voting.

The skilled person will be aware of many ECC mechanisms from data communications and data storage applications, such as the use of convolutional encoding, cyclic redundancy codes (CRC), and so on. These generally have a much higher efficiency than simply storing multiple copies of the code 611—i.e. they provide better protection against errors with a lower overhead in terms of additional storage capacity.

Memory 610 is normally long enough to store the full length of code 611. In other words, if code 611 has a length of 1023 chips (for example), then memory 610 has a capacity of at least 1023 bits to store the entire code on a bit for bit basis (plus additional storage for any redundancy or ECC facility). This is because if code 611 represents an arbitrary random sequence, then it cannot generally be compressed for storage in memory 610. This is in contrast to prior art systems that use Gold codes (or some derivative thereof)—these do not need to store the whole spreading code, but rather can use an LFSR to generate the spreading code as and when required.

After the code has passed through the ECC check 612, it is combined with the navigation data 617 by the channel generation subsystem 620. This combination is generally performed using some form of module-2 addition (exclusive-OR). The resulting channel is then passed to a modulation unit 625, where it is superimposed on a carrier signal using some appropriate modulation mechanism, such as binary phase shift keying (BPSK). Note that in some satellite systems, multiple channels may be modulated onto a single carrier signal. The carrier signal is then passed to transmitter 630 for broadcast to earth.

Although in theory code 611 may be "hard-wired" into memory 610 prior to launch, it is considerably more flexible if memory device 610 includes a write capability—e.g. it is implemented as some form of programmable read only memory (PROM). For example, if ECC check 612 does discover that the stored code 611 has been corrupted at all, then a write capability for memory device 610 allows the correct version of the code to be written back into the memory device 610 (the correct version of the code may be available from the ECC unit 612 itself, or may have to be provided by the ground control systems). There can also be various other reasons for wanting to update the code 611 stored in memory 610. For example, a new code might be installed to help improve performance during a testing phase, perhaps if the original code suffers from interference with some other service or satellite. There might also be commercial or security reasons for changing code 611, the former to raise licensing revenue perhaps, the latter to restrict access to the positioning signal to suitably authorised personnel.

It will be appreciated that this flexibility to change the spreading code emitted from a satellite does not exist in many existing systems, since such systems frequently incorporate an LFSR that is hard-wired to generate a particular Gold code. Such existing systems may then encrypt the spreading code to control access to the spreading code (whether for commercial or military reasons), but such encryption may impact performance and complexity of the receiver.

Figure 8:
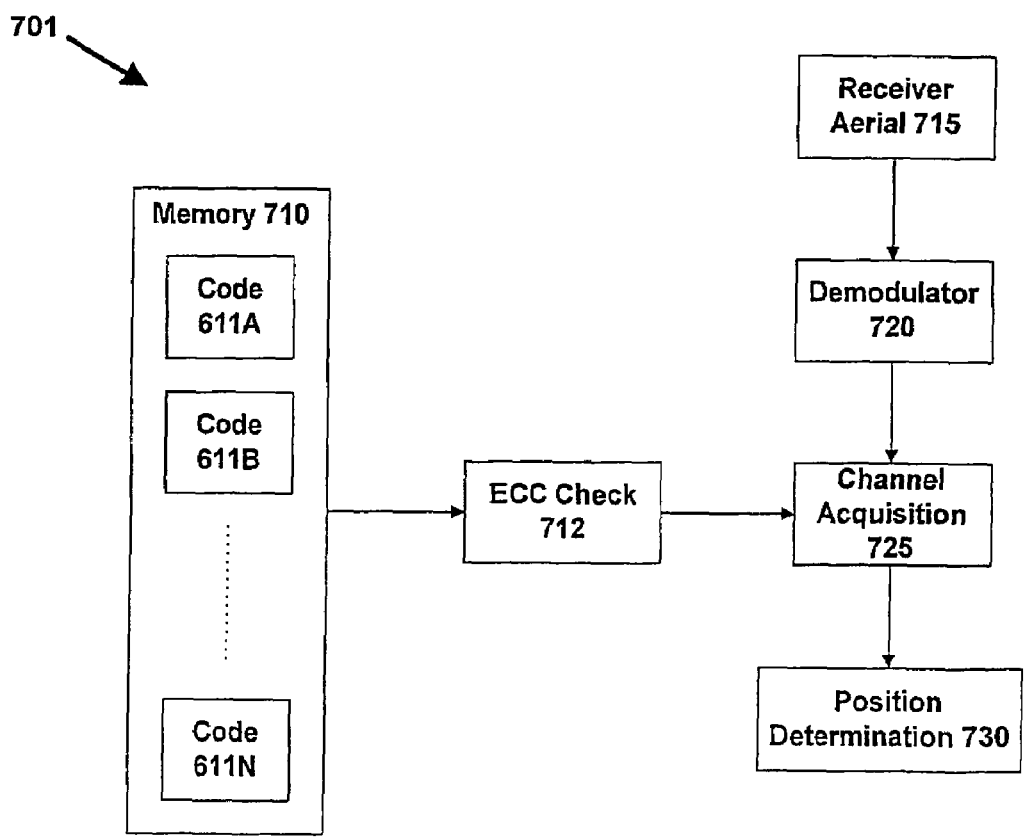
FIG. 8 is a high-level schematic diagram of a receiver system in accordance with one embodiment of the invention.

FIG. 8 is a high-level schematic block diagram of a receiver 701 in accordance with one embodiment of the invention. In operation, receiver 701 includes aerial 715 for receiving a satellite signal such as that transmitted by satellite 601. The aerial 715 links to a de-modulator 720, which in turn passes the incoming de-modulated signal to channel acquisition unit 725.

The receiver 710 also includes a memory device 710 that stores the code patterns 611A, 611B . . . 611N for the constellation(s) of satellites supported by receiver 701. Memory device 710 will generally store the entire bit patterns for codes 611A, 611B, etc, since as previously mentioned, a more compact representation of such codes is not generally possible in the absence of any formalised mathematical structure.

Memory device 710 may be provided as a read only memory (ROM), or it may have some update capacity, for example, being implemented as a programmable read only memory (PROM). The latter will be particularly appropriate where the codes 611A, 611B, . . . 611N are subject to update, either for commercial or security reasons. Note that in some circumstances memory 710 may represent some form of removable storage medium that can be inserted into and removed from receiver 701. For example, memory device 710 may comprise a smart card (analogous to a SIM in a mobile telephone) or a flash memory device. This might then allow the codes 611 in receiver 701 to be updated by replacing the removable memory device. A further possibility is that device 710 may be able to download codes from a remote system (e.g. a server) over some communication network, such as the Internet or a mobile telephone connection, for storage in and use from local RAM. This download may be subject to appropriate authorisation of the user, in order to restrict use of the satellite navigation system for commercial, security or legal reasons.

In some implementations, the output from memory 710 is passed through an ECC unit 712 to perform error detection and/or correction as described above in relation to the satellite system 601, although in other receivers the ECC check mechanism 712 may be omitted. The code 611 is then provided to the channel acquisition unit 725 so that the channel can be acquired from the de-modulated signal. Note that such acquisition may be performed sequentially by trying one code 611A, then another 611B, and so on. Alternatively, multiple codes (potentially all of them) may be correlated against the de-modulated signal in parallel. Once the receiver has locked into an incoming signal by identifying the presence of a particular spreading code 611A, 611B, the navigation data from that signal can be extracted and used by the position determination unit in conjunction with the timing of the received spreading code to help calculate the location of the receiver.

In many embodiments, receiver 701 may be able to receive signals from more than one satellite navigation system, for example, from both Galileo and from GPS. Although the spreading codes for GPS comprise Gold codes that can be implemented as LFSRS, it will be appreciated that such codes can also be stored in their entirety within memory device 710. Accordingly, the single architecture of memory 710 is compatible both with specific or bespoke code patterns, such as produced using the method of FIG. 1, as well as conventional code patterns derived from LFSRs.

Table 1 sets out the primary codes to be used for the Galileo E6-B and E6-C channels, while Table 2 sets out the primary codes to be used for the Galileo L1-B and L1-C channels (see the above-referenced paper by Hein et al for more information about the different Galileo channels). In operation, the E6-C code is combined with a secondary code of 100 chips, and the L1-C code is combined with a secondary code of 25 chips (there are no secondary codes for the E6-B or L1-B channels).

The code set of Table 1 comprises 100 codes, which covers an operational constellation of satellites (typically 24-30), plus any replacement missions, possible pseudolites, and so on, while the code set of Table 2 comprises 137 codes (providing additional codes for use with another compatible satellite navigation system if required). The E6-B and E6-C codes each have a length of 5115 bits, while the L1-B and L1-C codes each have a length of 4092 bits. These codes lengths have been determined to provide the desired bit rate for the relevant navigation data, plus the selection of a chip rate that is an integral multiple of the chip rate used by the GPS satellites (which helps compatibility between the GPS and Galileo systems).

The codes are represented using base 64—i.e. each 6 bits are grouped together and represented by a single symbol according to Table 3 below. The listings of Tables 1 and 2 have been padded at the ended to complete the base-64 encoding (i.e. the actual spreading codes represent the first 5115 bits for Table 1, and the first 4092 bits for Table 2). Further details about base-64 encoding and decoding can be found in rfc1113 (see www.faqs.org/rfcs/rfc1113.html).

TABLE 3

Base 64 encoding

| Decimal | 0-25 | 26-51 | 52-61 | 62, 63 |
|---|---|---|---|---|
| Binary | 000000-011001 | 011010-110011 | 110100-111101 | 111110, 111111 |
| Symbol | A-Z | a-z | 0-9 | +, / |

Each of the Galileo satellites will be provided with one of the E6-B, E6-C, L1-B and L1-C codes from Tables 1 and 2 for broadcast. In contrast, a receiver 701 will generally incorporate the complete set of codes for each of the services that it supports, although in some cases a receiver may only support a subset of the total codes for a service, for example only those that have been allocated to launched satellites. It will also be appreciated that a receiver can generally tolerate minor discrepancies between its stored codes and those received from a satellite. In other words, the codes stored into a receiver may not exactly match those of Tables 1 and 2 (depending upon the supported services), but will be sufficiently close to permit identification of and synchronisation to the relevant codes.

Figure 9:
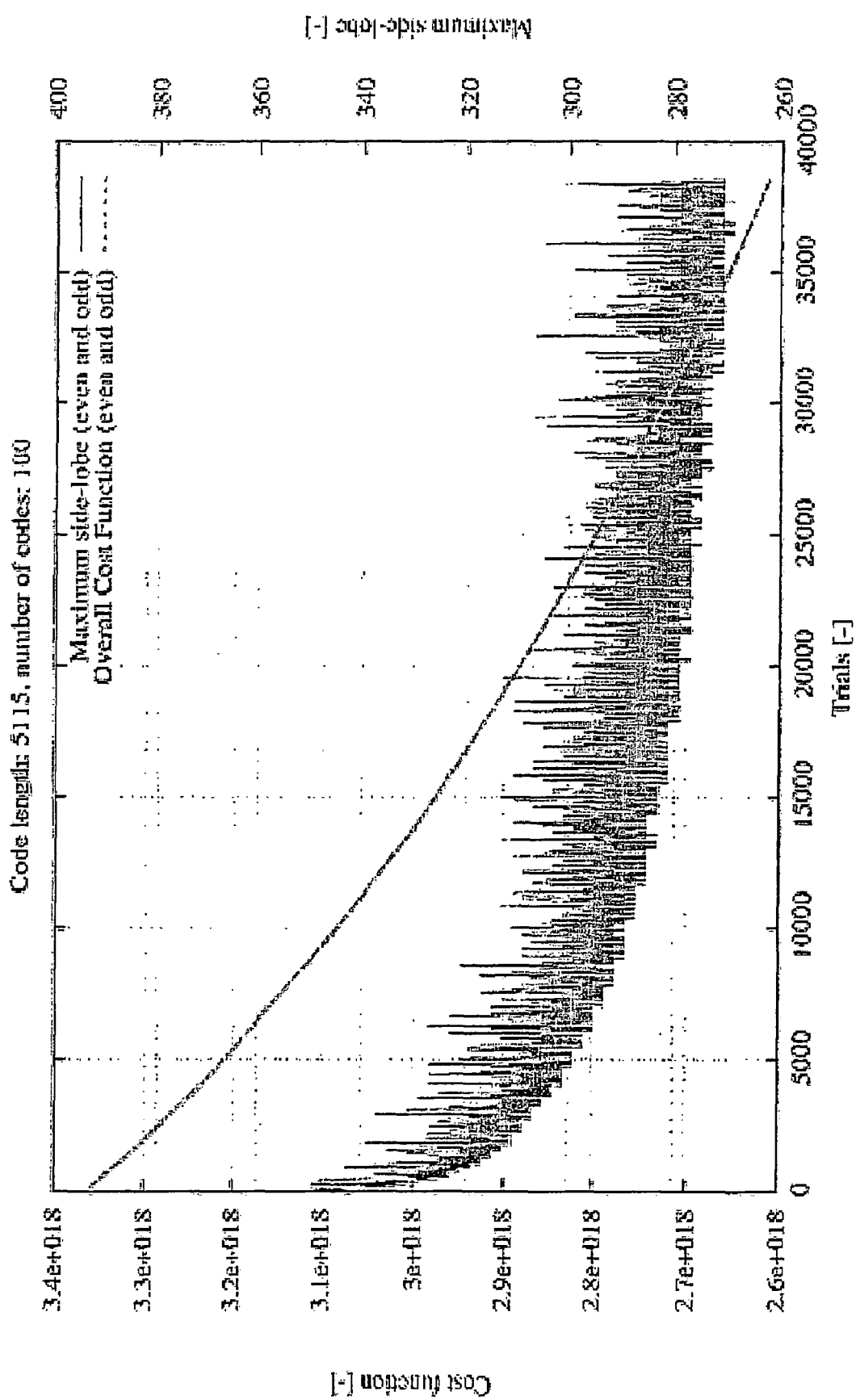
FIG. 9 is a plot showing the reduction in cost function with optimisation for a second set of codes in accordance with one embodiment of the invention.
Figure 10:
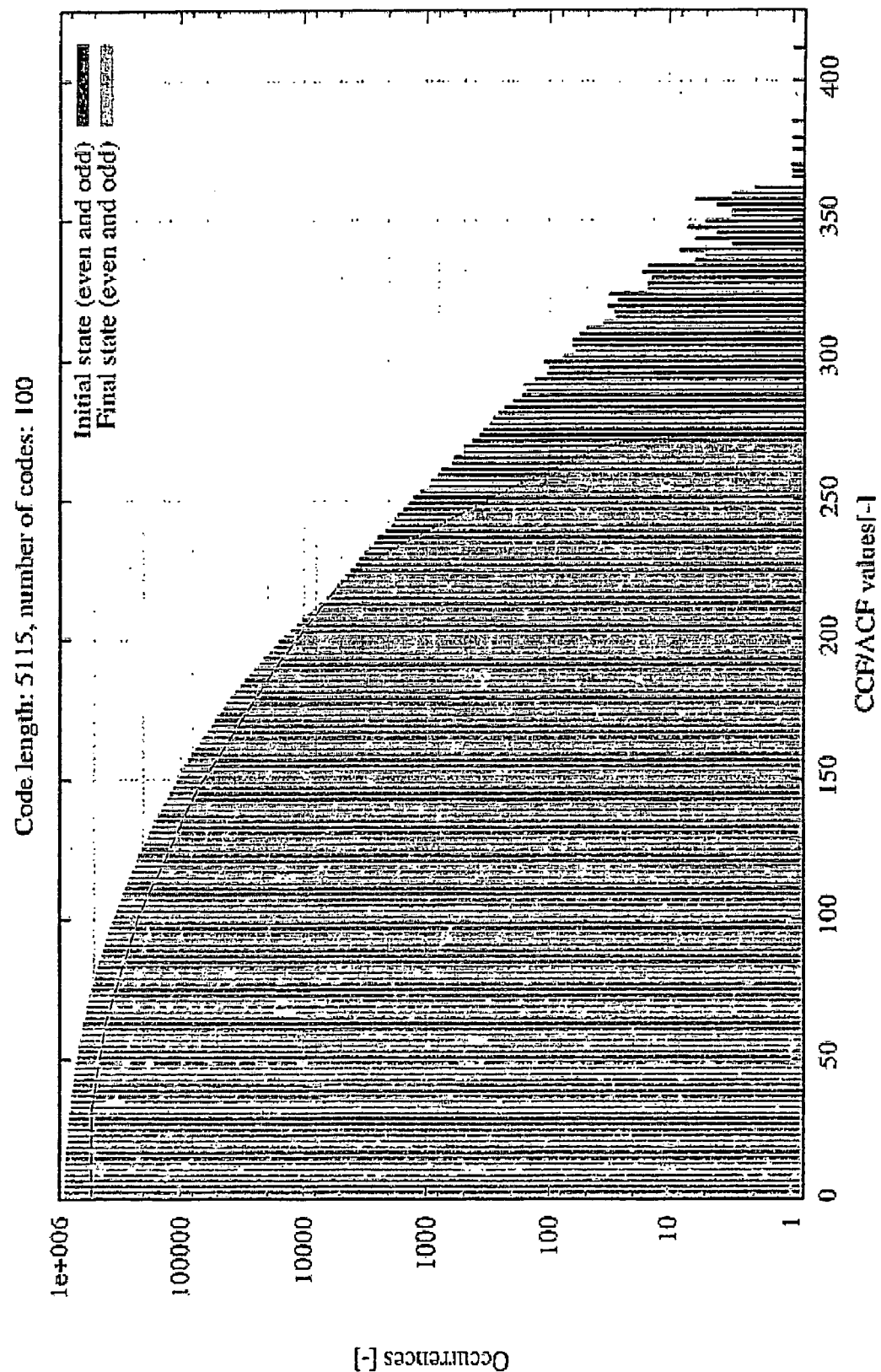
FIG. 10 is a plot showing the improvement in correlation values for the second set of codes resulting from the optimisation of FIG. 9.
Figure 11:
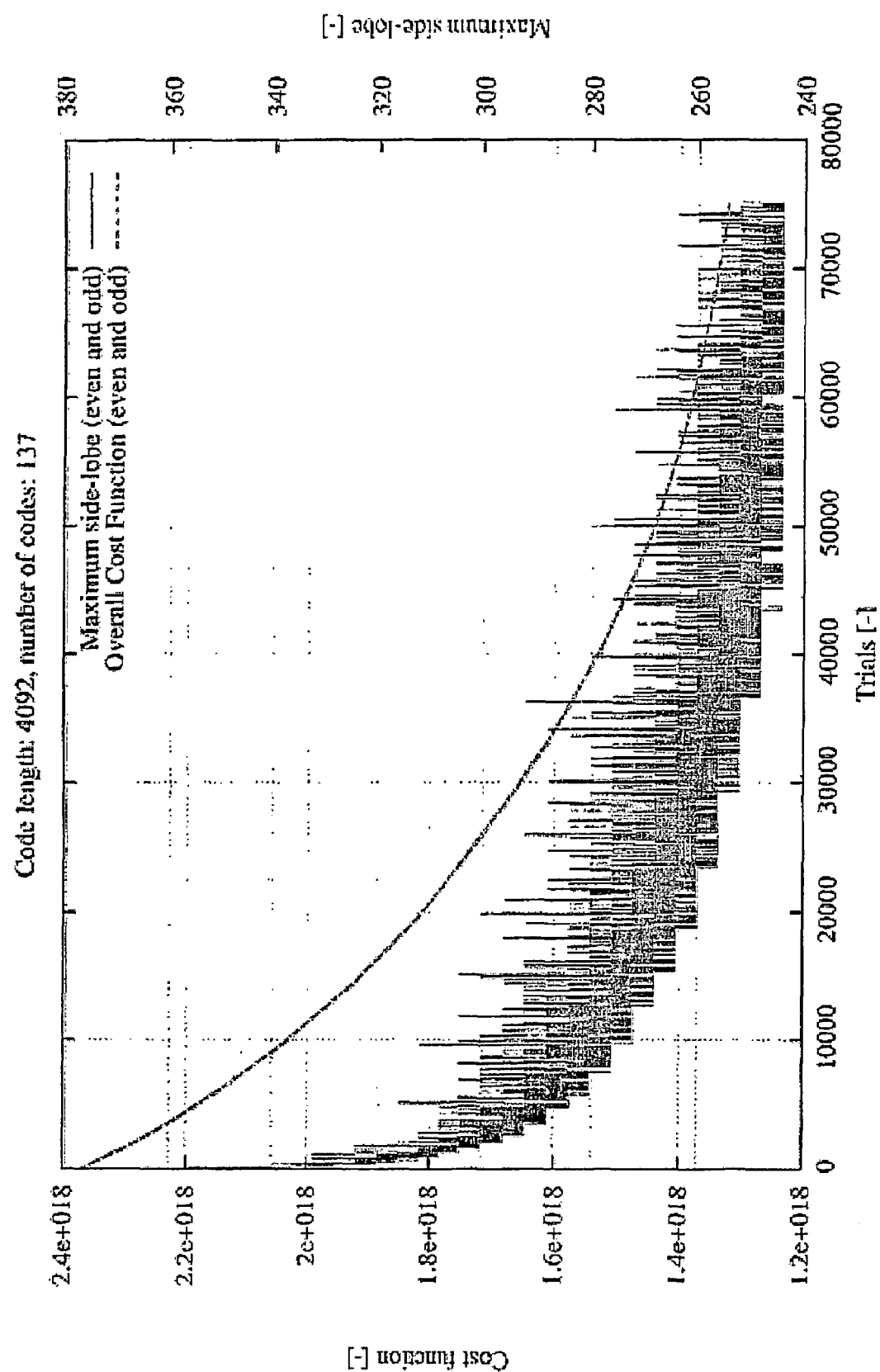
FIG. 11 is a plot showing the reduction in cost function with optimisation for a third set of codes in accordance with one embodiment of the invention.
Figure 12:
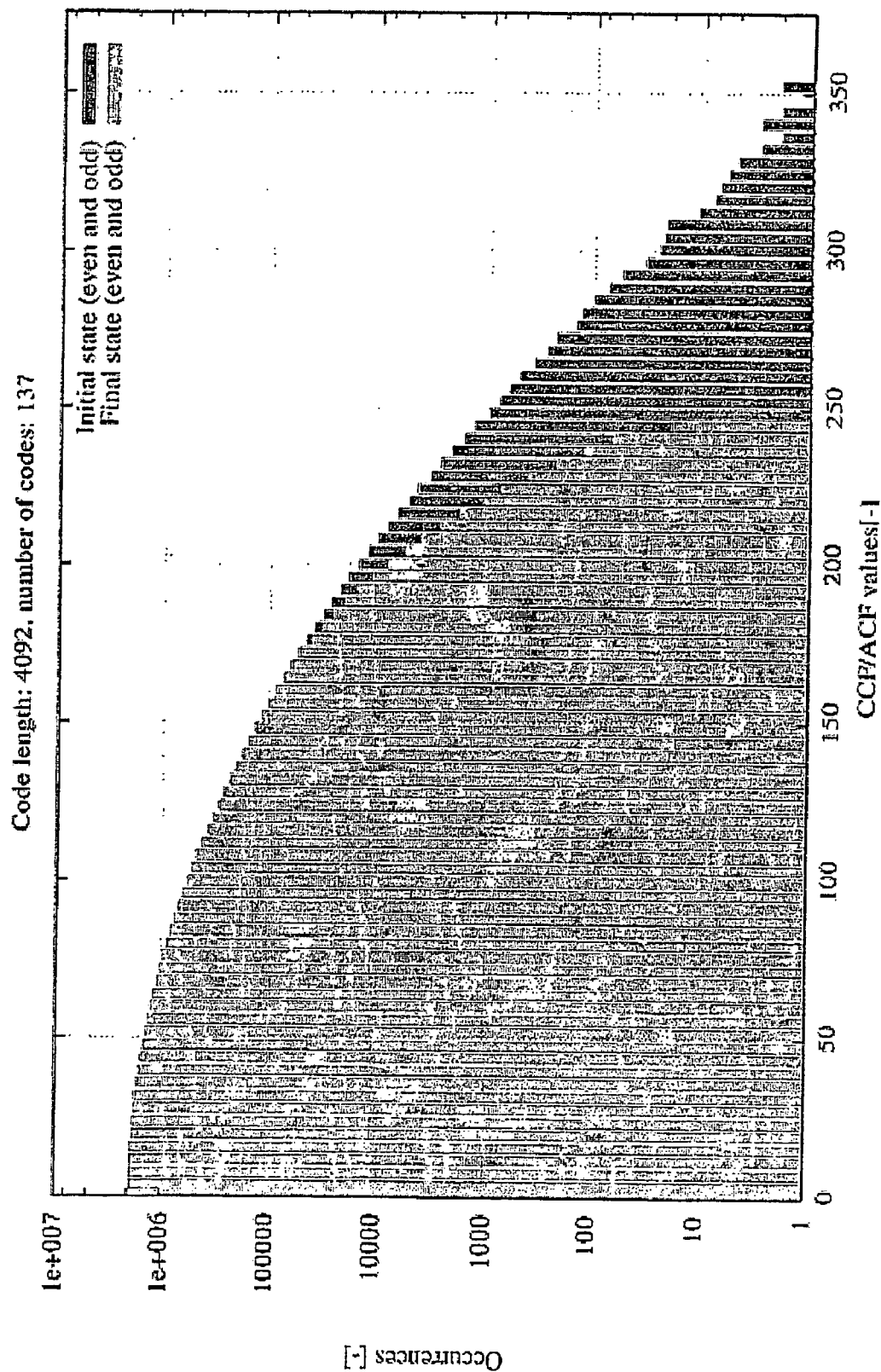
FIG. 12 is a plot showing the improvement in correlation values for the second set of codes resulting from the optimisation of FIG. 11.

FIGS. 9 and 10 illustrate the optimisation process for the E6 codes (chips), while FIGS. 11 and 12 illustrate the optimisation process for the L1 codes (4092 chips). FIGS. 9 and 11 have generally the same format as that described above in respect of FIG. 4, and show the improvement in cost function as a result of the optimisation procedure. The abscissa in these diagrams represents the number of trials, while the ordinate represents two different cost functions. The first cost function is based on the Welch bound, analogous to that given by Equation 6 above, and corresponds to the scale on the left-hand side of the graph. The second cost function represents the (unnormalised) maximum side-lobe value, analogous to that given by Equation 3 above, and corresponds to the scale on the right-hand side of the graph. Note that these two cost functions are calculated using both odd and even correlation functions.

FIGS. 10 and 12 have generally the same format as that described above in respect of FIG. 6, and show the improvement in cost function between the initial and final codes set as a result of the optimisation procedure. In particular, these two diagrams represent histograms of the (unnormalised) maximum side-lobe value for the initial code set and for the final code set. In both cases, the cost function is calculated using both the odd and even correlation functions. In FIG. 10 a line has been added to demarcate more clearly between the initial and final states. The dashed portion of this line follows approximately the top of the histogram for low side-lobe values for the initial code set, and it can be seen that this lies below the level of the corresponding histogram for the final code set. The dotted portion of this line follows approximately the top of the histogram for higher side-lobe values for the final code set, and it can be seen that this lies below the level of the corresponding histogram for the initial code set.

It can be seen from FIGS. 9, 10, 11 and 12 that the optimisation procedure has led to a significant improvement in the final code sets compared to the original code sets. In particular, the improvement in the maximum side-lobe value between the initial and final code sets is approximately from 410 to 275 (21.9 dB to 25.4 dB) for the E6 codes (5115 chips), and from 355 to 245 (21.2 dB to 24.5 dB) for the L1 codes (4092 chips).

In conclusion, although a variety of particular embodiments have been described in detail herein, it will be appreciated that this is by way of illustration only. The skilled person will be aware of many further potential modifications and adaptations that fall within the scope of the claims and their equivalents.

The invention claimed is:

1. A method of creating a set of spreading codes for use in a satellite navigation system comprising a constellation of satellites, wherein each satellite in the constellation is to be allocated a spreading code from said set of spreading codes, the method comprising:
generating an initial set of bit patterns, wherein each bit pattern represents a potential spreading code; and
performing, on a hardware system, an optimisation process on the initial set of bit patterns, whereby at least some of the bit patterns in said initial set of bit patterns are modified, to create a final set of bit patterns for use as the set of spreading codes;
wherein each bit pattern in said initial set has first auto-correlation side-lobes of zero, and wherein the modification to a bit pattern performed as part of the optimisation process retains the zero value of the first auto-correlation side-lobes.

2. The method of claim 1, wherein each bit pattern in the initial set of bit patterns is generated as a random sequence of bits.

3. The method of claim 2, further comprising balancing each random sequence of bits in the initial set prior to performing the optimisation process.

4. The method of claim 3, wherein the modifications to a bit pattern performed as part of the optimisation process retain the balance of the bit pattern.

5. The method of claim 1, wherein the optimisation process seeks to minimise a cost function for the set of bit patterns, and wherein said cost function is based on auto-correlation and cross-correlation values for the set of bit patterns.

6. The method of claim 5, wherein said cross-correlation values are calculated for all possible offsets between the bit patterns.

7. The method of claim 5, wherein said cost function is based on odd and even auto-correlation and cross-correlation values for the set of bit patterns.

8. The method of claim 5, wherein said cost function is based on a summation of all auto-correlation and cross-correlation values greater than a predetermined bound.

9. The method of claim 8, wherein said predetermined bound is derived from the Welch bound.

10. The method of claim 1, further comprising modifying the bit patterns during the optimisation process by randomly flipping bits in at least one of the bit patterns.

11. The method of claim 10, further comprising reducing the number of bits flipped as a cost function decreases.

12. The method of claim 1, wherein the number of bits in a bit pattern is in the range 1000 to 10000.

13. A receiver incorporating a set of stored bit patterns corresponding to spreading codes used by a satellite navigation system, wherein the set of stored bit patterns are stored in a read only memory (ROM), wherein the receiver uses the set of stored bit patterns to acquire signals from the satellite navigation system, and wherein the set of stored bit patterns are created by:
- generating an initial set of bit patterns, wherein each bit pattern represents a potential spreading code, and
- performing an optimisation process on the initial set of bit patterns, whereby at least some of the bit patterns in said initial set of bit patterns are modified, to create the set of stored bit patterns;
- wherein each bit pattern in said initial set has first auto-correlation side-lobes of zero, and wherein the modification to a bit pattern performed as part of the optimisation process retains the zero value of the first auto-correlation side-lobes.

14. The receiver of claim 13, wherein the set of stored bit patterns are protected by an error-correcting code.

15. The receiver of claim 14, wherein the read only memory is a programmable read only memory (PROM).

16. The receiver of claim 13, wherein said receiver incorporates bit patterns for at least two satellite constellations, wherein one of said satellite constellations comprises GPS.

17. The receiver of claim 13, wherein said set of stored bit patterns includes at least one bit pattern substantially as set out in Table 1 or Table 2.

18. The receiver of claim 17, wherein said set of stored bit patterns includes at least twenty bit patterns that are substantially as set out in Table 1 or Table 2.

19. The receiver of claim 13, wherein said set of stored bit patterns are balanced.

20. A method of operating a receiver for use in conjunction with a satellite navigation system, the method comprising:
- accessing a set of stored bit patterns corresponding to spreading codes used by the satellite navigation system, wherein the set of stored bit patterns are stored in a read only memory and are created by:
  - generating an initial set of bit patterns, wherein each bit pattern represents a potential spreading code, and
  - performing an optimisation process on the initial set of bit patterns, whereby at least some of the bit patterns in said initial set of bit patterns are modified or replaced, to create the set of stored bit patterns;
- wherein each bit pattern in said initial set has first auto-correlation side-lobes of zero, and wherein the modification to a bit pattern performed as part of the optimisation process retains the zero value of the first auto-correlation side-lobes; and
- using the stored bit patterns to acquire signals from the satellite navigation system to perform a position determination in relation to the signals from the satellite navigation system.

21. The method of claim 20, wherein the set of stored bit patterns are stored in a programmable read only memory (PROM), and the method further comprises updating the set of stored bit patterns by writing a new set of bit patterns into the receiver.

22. The method of claim 20, wherein the set of stored bit patterns are accessed by the receiver over a network.

23. The method of claim 20, wherein the set of stored bit patterns correspond to codes from GPS satellites.

24. Apparatus for use as part of a satellite navigation system, the apparatus including at least a bit pattern from a set of stored bit patterns, wherein the bit pattern corresponds to a spreading code for use by the apparatus, wherein the apparatus retrieves the bit pattern to generate a signal incorporating the spreading code for transmission as part of the satellite navigation system, and wherein the set of stored bit patterns are stored in a read only memory and are created by:
- generating an initial set of bit patterns, wherein each bit pattern represents a potential spreading code, and
- performing an optimisation process on the initial set of bit patterns, whereby at least some of the bit patterns in said initial set of bit patterns are modified or replaced, to create the set of stored bit patterns;
- wherein each bit pattern in said initial set has first auto-correlation side-lobes of zero, and wherein the modification to a bit pattern performed as part of the optimisation process retains the zero value of the first auto-correlation side-lobes.

25. The apparatus of claim 24, wherein the set of stored bit patterns are substantially as set out in Table 1 or Table 2.

26. The apparatus of claim 24, wherein the bit pattern is protected by an error-correcting code.

27. The apparatus of claim 24, wherein said apparatus comprises a pseudolite.

* * * * *